May 5, 1964

T. J. ECKER 3,132,203

CURLED BUS BAR

Filed June 19, 1961

INVENTOR.
THEODORE J. ECKER

BY

AGENT 3,132,203
Patented May 5, 1964

3,132,203

CURLED BUS BAR

Theodore J. Ecker, Brooklyn, N.Y., assignor to Sperry Rand Corporation, New York, N.Y., a corporation of Delaware Filed June 19, 1961, Ser. No. 117,863
4 Claims. (Cl. 174—102)

The present invention relates to a bus bar. More particularly, the invention is concerned with the provision of a bus bar designed to provide a constant potential for a large number of electrical devices which are supplied thereby with current. In present day switching networks such as may be encountered in large scale electronic computers, it is necessary to place a great many components within the confines of a comparatively small amount of space. Such components require a large amount of interconnecting wiring. As the packing density of components increases, a problem is encountered with stray capacitances and inductances among the large number of individual conductors. These stray effects may generate random currents or "noise" within the system which "noise" may cause errors to arise. The problem is particularly acute in connection with devices for which comparatively small potential swings occur, wherein the presence of the "noise" in the circuit may induce voltages which substantially approach the magnitude of the proper signal voltages.

When it is desired to apply a constant potential to a large number of components it is most convenient to do so by means of a bus bar. Such bus bar may extend for a considerable length throughout the overall circuit assembly and may be in extremely close proximity to large numbers of individual conductors which, in turn, are likely to induce currents in the aforesaid bus bar thereby causing varying potentials to be applied to the components attached thereto. Such varying potentials, in view of the very small potential swing encountered in the bus bar itself are likely to give rise to errors in the operation of the overall circuit. The improved bus bar of the invention has a substantially lowered inductance and by virtue thereof is more capable of maintaining constant potentials unaffected by cross talk from the many surrounding conductors.

Accordingly, it is an object of the invention to provide an improved bus bar.

Another object of the invention is the provision of a bus bar exhibiting substantially lowered induction over prior art bus bars.

A still further object of the invention is the provision of a spirally wound bus bar whereby such bus bar occupies a smaller amount of space.

Another object of the invention is the provision of an improved bus bar using a smaller amount of material in its construction.

Other objects and advantages will become apparent as the description proceeds.

Figure 1:
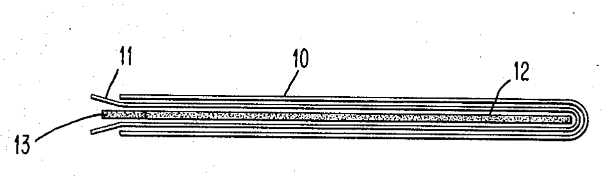
FIG. 1 PRIOR ART
Figure 1A:
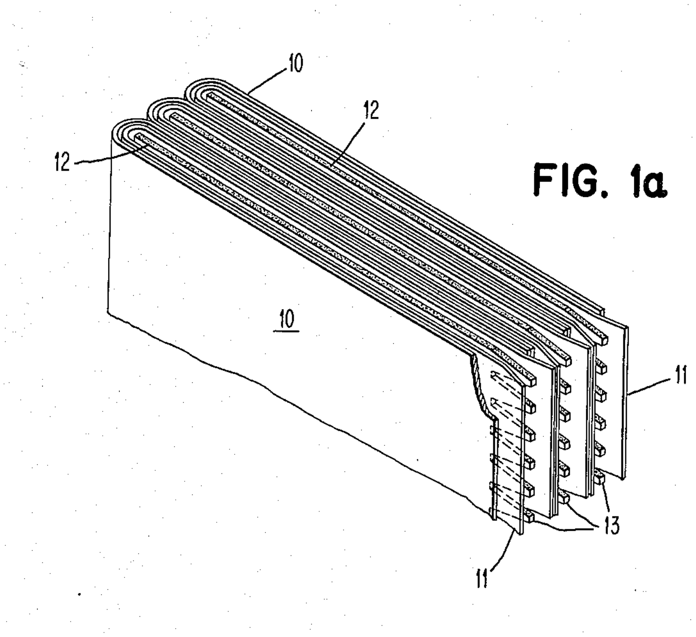
FIG. 1a PRIOR ART
Figures 2, 2A:
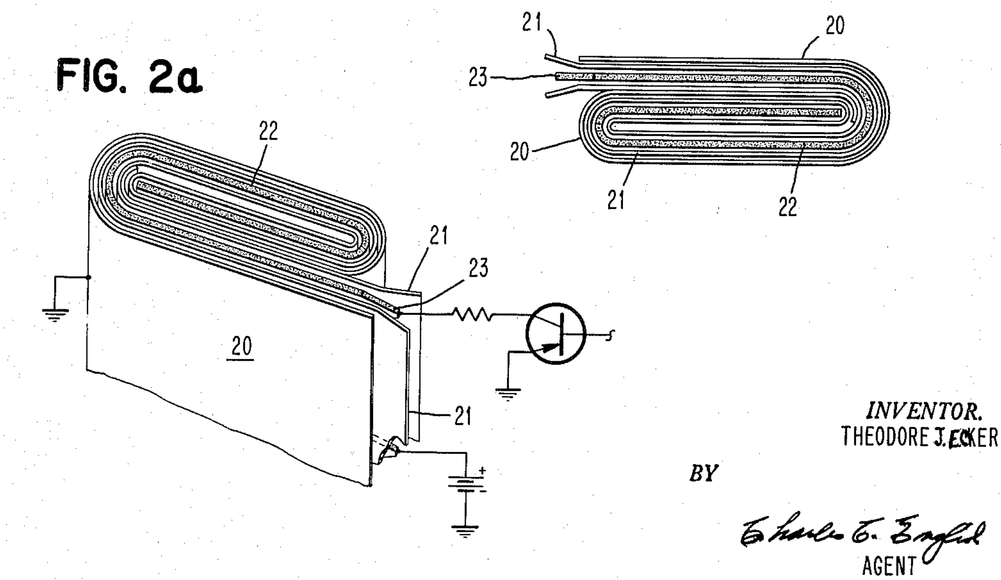

In the drawings, FIGURE 1 is a diagrammatic cross-sectional representation of a bus bar as formerly provided;

FIGURE 1*a* is a perspective view of a plurality of the bus bars formerly in use assembled together;

FIGURE 2 is a diagrammatic cross-sectional representation of the new and improved bus bar of the present invention.

FIGURE 2*a* is a perspective view of the bus bar of the present invention showing certain circuit elements connected thereto.

Briefly the invention comprises a bus bar formed from an elongated spirally wound strip of conducting material, a layer of insulating material applied to both sides thereof and a second strip of conducting material wound about the first strip but isolated therefrom by the insulating material. A plurality of external punched connecting tabs are provided on an exposed edge of the first strip of material along the length thereof.

FIGURE 1 shows a form of bus bar previously used in similar applications while FIGURE 1*a* shows how a plurality of these bus bars may be laid together. In FIGURES 1 and 1*a*, reference numeral 12 designates an elongated flat strip of conducting material which may, for instance, be a length of flat copper stock; said strip may be punched along one edge thereof so as to form a plurality of tabs 13, to which various electrical components may be attached. Wrapped around the conducting strip 12 is a layer of thin, insulating material 11. External to the insulation and the conducting strip 12 a further wrapping 10 of conducting material is applied which once again may be copper. This external wrapper comprises a ground for the bus and may be connected to ground or to a source of reference potential.

It is observed that a bus bar in this form will exhibit substantial width. In a computer or similar type of switching network involving many thousands of separate conductors it is apparent that such a bus bar will take up a considerable amount of space and at the same time will be in close proximity with many other conductors particularly when the packing density of components is high. Accordingly, such a bus bar is susceptible to the inducing therein of stray potentials from the surrounding conductors.

The present invention avoids such problems and one specific embodiment is shown in FIGURE 2. FIGURE 2 uses substantially the same materials as the prior form of bus bar. A central conducting member 22 having the same cross-sectional area as the conductor 12 is provided with connecting tabs 23 along one exposed edge thereof. Applied to and completely surrounding this conducting member 22 is a wrapping of insulation 21 which for example, may be comprised of Mylar. External to the assembly is a further conducting member 20 which again may comprise copper and which as in the prior arrangement can be connected to ground or a source of reference potential.

The conducting member 22 is folded upon itself along its length so as to form a spiral. Thus, one edge thereof is folded towards the center and the other edge folded over the first edge so that the first edge is completely inside the folded arrangement while the second edge provided with the tabs is exposed. Except for the tabs themselves the first conductor is completely covered and surrounded with insulating material so that this also is spirally wound. A comparison with the prior arrangement illustrated by FIGURE 1, will show that the ground conductor 20 requires only about half the material formerly required. It is apparent that the ground conductor 20 is not folded or wound completely around the principal conductor 22 but is applied only to one side thereof. However, when the assembly has been completed by a folding process the ground conductor 20 is external to the assembly and is at least partially contiguous to both sides of the principal conductor 22.

By applying the ground conductor 20 in the aforesaid manner and subsequently wrapping or winding the assembly upon itself along its length, the bus bar will have substantially less width than the bus bar of the prior art. From FIGURE 1 it is apparent that ground conductor 10 of the prior art arrangement is approximately twice the width of principal conductor 12. With the improved arrangement of FIGURE 2 it is apparent that ground conductor 20 is the same width as principal conductor 22. Thus, the amount of material required for the aforesaid ground conductor is substantially reduced. However, it will be obvious that the cross-sectional area of the principal conductor 22 may be maintained the same as in the prior arrangement. As in the case of the prior arrangement shown by FIGURE 1A, it is possible to stack together a number of the improved bus bars of the present invention so that external conductor 20 provides a continuous ground as formerly.

With the decreased width afforded by the folded bus assembly of the invention, when such a bus is installed in a computer or similar complex circuit there will be fewer conductors in close proximity thereto. Thus there is a decreased tendency to induce stray currents in the bus, whereby the potential to be applied to various circuit components thereby may be more closely maintained at a constant level.

Other modifications of the invention will be readily apparent to an expert in the art and all such are intended to be covered in accordance with the scope of the appended claims.

I claim:

1. A folded bus bar comprising an elongated flat strip of conducting material provided with attaching tabs along one edge thereof, said strip being folded upon itself in at least one fold along its length, a layer of insulating material wrapped about and surrounding said strip so that only said tabs are exposed therefrom and a second elongated flat strip of conducting material wrapped around the externally exposed surface of said insulating material.

2. A bus bar for applying constant potential to a plurality of electrical devices comprising in combination a first elongated conductor in the form of a flat strip, a sheet of insulating material wrapped around said first conductor, so as to expose one edge only, a plurality of tab members connected to the exposed edge of said first conductor, a second elongated conductor in the form of a flat strip arranged in juxtaposition to said insulating material, the combination being folded along its length in a plurality of folds so that the second conductor forms an external wrapping member for said first conductor and said sheet of insulating material except for the exposed edge of said first conductor.

3. A folded bus bar comprising a first elongated strip of conducting material folded upon itself along its length so that one edge only is exposed, a plurality of projecting tabs attached to the one exposed edge of said first strip, a second elongated strip of conducting material folded about said first strip so as to surround said first strip externally and a layer of insulating material completely interposed between said first and second strips thereby to effect electrical isolation of said strips.

4. A bus bar for applying a constant potential to a plurality of electrical devices comprising an elongated spirally wound strip of conducting material, said conducting material being provided with a plurality of externally projecting connecting tabs along the length thereof, a thin layer of insulating material applied to both sides of said strip and a second spirally wound strip of conducting material applied to one side of the first named strip and isolated therefrom by said insulating material.

References Cited in the file of this patent

UNITED STATES PATENTS

| | | |
|---|---|---|
| 243,180 | Ware | Jan. 21, 1881 |
| 1,702,993 | Brown | Feb. 19, 1929 |